United States Patent [19]

Wilkinson

[11] 3,844,030

[45] Oct. 29, 1974

[54] COMPOSITE OF METAL AND THERMOSET PLASTIC, AND METHOD OF MAKING IT

[75] Inventor: Robert E. Wilkinson, Lafayette, Ind.

[73] Assignee: Rostone Corporation, Lafayette, Ind.

[22] Filed: Sept. 25, 1972

[21] Appl. No.: 292,188

[52] U.S. Cl................ 29/592, 29/624, 174/50.51, 174/50.56, 264/135, 264/347, 336/90, 336/94
[51] Int. Cl........................................... H01f 27/02
[58] Field of Search........ 29/624, 627, 592; 336/90, 336/92, 94, 96; 174/50.5, 50.51, 50.52, 50.54, 50.56, 50.58, 50.6, 50.61, 50.62, 52, 59, 60, 65; 204/58; 117/213, 218, 62, 62.2, 153 R, 152 R, 37, 70 R, 70 C, 72, 75, 77, 132 B; 264/255, 272, 262, 134, 135, 347; 220/46 R, 63 R

[56] References Cited
UNITED STATES PATENTS

| | | | |
|---|---|---|---|
| 3,233,198 | 2/1966 | Schrader et al. | 336/94 |
| 3,388,212 | 6/1968 | Nichols et al. | 29/592 |

Primary Examiner—Richard J. Herbst
Assistant Examiner—Joseph A. Walkowski
Attorney, Agent, or Firm—Trask, Jenkins & Hanley

[57] ABSTRACT

An integrally bonded composite structure of a substrate part or layer of metal or the like, an elastic interface layer, and a thermoset plastic wall or layer molded in place against it is formed by: (1) coating the substrate, as by spraying, with a thin coating of a thermosetting soluble elastomer, such as a chloroprene rubber (Neoprene), formulated to chemically bond to the substrate surface, and also containing a coupling agent which will react with the thermoset plastic layer during curing of the latter; (2) heating the coating to dry and stabilize the same on the substrate so as to withstand transfer flow of molding composition but without completely curing the coating composition; and (3) molding the plastic layer against the coated substrate under heat and pressure as in a heated molding die while the coating is in incompletely cured state, and thereby completing the curing of the coating as the molded plastic layer is cured and producing an integral chemical bond from the molded layer through the interface layer to the substrate. This gives an impervious seal between the substrate and the plastic and a bond with very high resistance to separation. The parts and the interface between them may be of either simple or complex shape.

15 Claims, 10 Drawing Figures

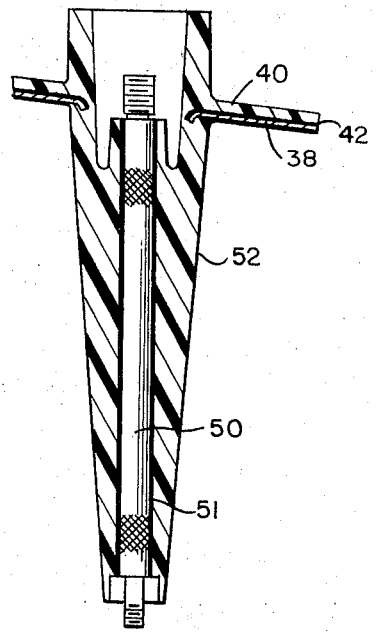
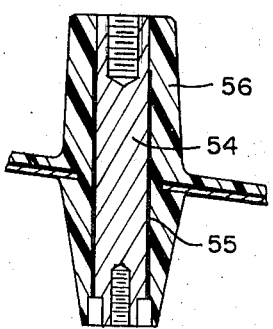
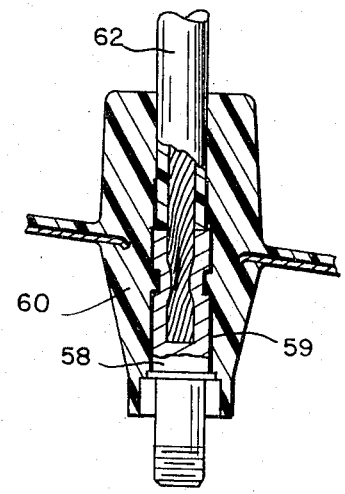
Fig.4    Fig.5    Fig.6
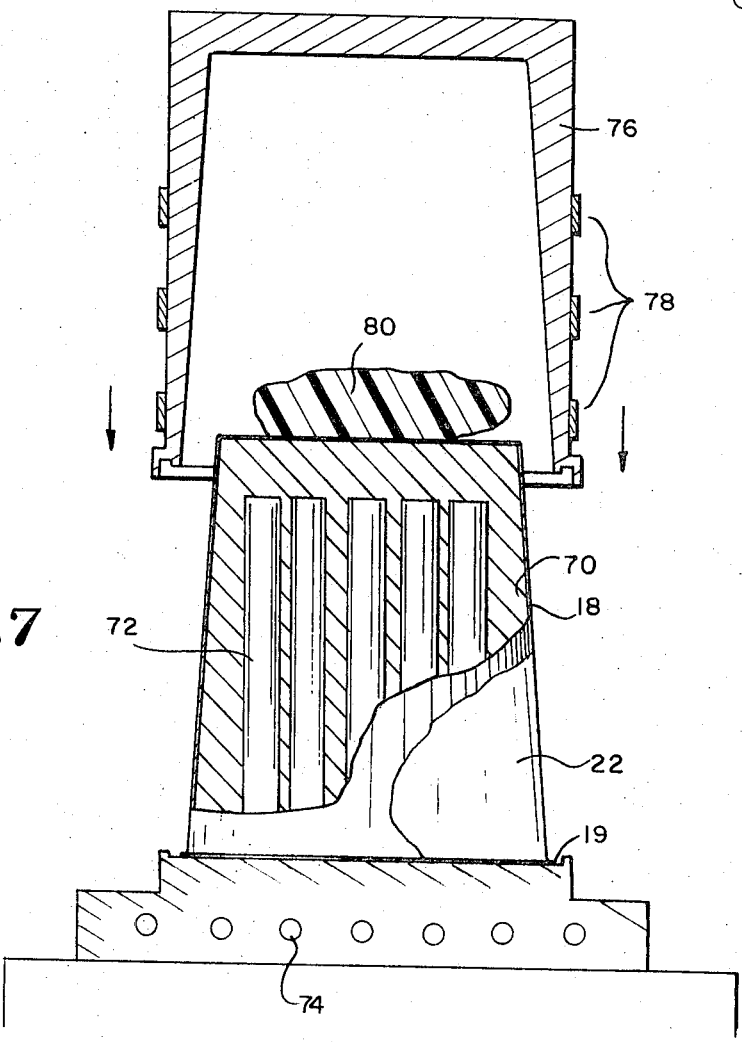
Fig.7

COMPOSITE OF METAL AND THERMOSET PLASTIC, AND METHOD OF MAKING IT

BACKGROUND OF THE INVENTION

This invention relates to an integrally-bonded composite of a substrate part of layer of metal or the like and a thermoset plastic layer molded in place under heat and pressure against the substrate layer and integrally and chemically bonded to it by an intervening elastomeric bonding and shock-resisting interface layer; and to a method of making such composite.

Numerous situations exist, especially in the electrical field, where it would be highly advantageous to have a metal part or layer bonded to a molded thermoset plastic wall or layer with a bond which has a very high resistance to separation and which forms an impervious seal between the two parts. Thermosetting plastic molding compositions, such as glass-reinforced polyester compositions, find wide usefulness in the electrical field, as for forming supports and housings for electrical apparatus. Such resins would have even greater usefulness if they could be made to bond to metal inserts and walls with a bond which would provide reliable high resistance to separation and leakage. In many applications it is essential that the molding and its interface with the metal be free of voids or separation spaces, in order to prevent corona discharge in such spaces which would degreade the plastic, to prevent the collection of moisture which would cause corrosion of the metal, and/or to prevent leakage along the interface between the two layers. Also, in many instances, the adjoining metal and plastic parts must provide such characteristics under adverse conditions such as large temperature changes and differences and thermal shock. These properties may be obtained or enhanced by the presence of an interface layer which provides some degree of elasticity at the interface, and the interface layer may provide other properties, for example, by containing carbon or other components giving it electrical conductivity.

U.S. Pat. No. 3,388,212 to Nichols et al. shows a plastic bushing cast about an electrical conductor and in an enclosure wall opening. A coating of elastomer is vulcanized to the wall edge and the insert before the bushing is formed and is said to form a seal with the bushing. However, there the seal is between a completely vulcanized rubber layer and a cast epoxy plastic material which has adhesive properties, and that process is not applicable to other resin materials such as polyester resin materials which do not possess similar adhesive properties but which otherwise have highly desirable properties. Also, the seal and bonding there obtained is not as good as that obtained by the present invention.

In the copending application of myself and others, Ser. No. 292,187, filed Sept. 25, 1972, it is proposed to provide an electrical transformer to be buried under ground. This requires a sealed housing which will withstand the various adverse physical and chemical conditions of a direct-buried environment, and which provides under such adverse conditions a substantially complete barrier to leakage or diffusion of moisture through the housing walls to contaminate the oil or cause deterioration of the electrical insulation, for example, to limit entry to not more than 50 parts moisture per million parts of transformer oil over a life of 20 to 30 years.

Molded plastic materials, such as molded glass-reinforced polyester resins, have a number of advantageous properties for this application. However, wall molded of these resins are not completely impervious and moisture passes through them by diffusion, and it has been found necessary to provide such transformer housings with a metal liner to form a more effective vapor barrier. It is essential in the lined plastic housing that the metal lining and the plastic be securely and permanently bonded so that there can be no pockets at the interface in which corona could occur to cause degradation of the plastic or in which moisture could collect to cause corrosion of the metal, or where gas could expand under temperature changes to separate the liner layer from the plastic layer of the wall to create larger pockets.

Also, in such an underground transformer housing it is necessary to provide high voltage and low voltage conductors through the housing wall, as through its cover, and it is especially desirable that such terminals be provided as inserts in the molded housing as it is molded.

The present invention provides a method of forming a composite wall for such an underground transformer in which a metal vapor barrier liner is integrally bonded to a surrounding plastic wall molded in place against the liner. It also provides a method of forming a composite between the molded-in conductor terminal inserts and the molded resin wall, in which the metal inserts are securely bonded to the wall and sealed thereto with a seal which is highly impervious to leakage. The method is also applicable to produce other composites, such as terminal insulating bushings with metal conductors molded therein for other applications, circuit boards having a conductive layer bonded to a supporting molded plastic wall, chemical plumbing and pump parts in which a thin non-corrosive metal liner is combined with an inexpensive mechanical support molded of thermoset molding composition, etc. With the improved method of forming a securely bonded composite, various other applications will be evident to those skilled in the art.

SUMMARY OF THE INVENTION

In accordance with the invention, an integrally bonded composite is made as follows; A substrate part of layer of metal or the like is prepared in a configuration to have a plastic wall or layer molded in place against it, for example, by shaping a metal liner for a transformer tank, or forming a conductor terminal for insertion in the cover of such a tank. The surface of the substrate part, over that portion thereof to which bonding is desired, is sprayed or otherwise coated with a thin coating of a solution of soluble thermosetting elastomer composition, such as a composition of a chloroprene rubber available as Neoprene, adapted to form an elastomer layer which will be chemically bonded to the substrate surface. Preferably, an elastomer composition is used which contains a bonding agent for this purpose. The elastomer composition also contains a coupling agent which will react with the subsequently applied thermosetting resin composition of the resin wall or layer during curing of that latter. The coating is heated as in an oven to drive off the solvent and leave on the surface of the substrate over its entire bonding area a continuous coating of the elastomer composition sufficiently stabilized so as to withstand the transfer flow which occurs in molding the thermoset resin wall or layer against it but which remains in incompletely cured state.

A thermosetting resin composition is then molded against the coated substrate under heat and pressure, as in metal dies. The coated substrate part is mounted in the dies so that its coated surface is exposed to have the molding composition molded in place against it, and the molding operation may be in accordance with conventional molding practices. The conditions provided for molding and curing the molding composition will not only cure the molded section but will also complete the curing of the elastomer coating on the substrate while in intimate contact with the molded section so that the concurrent curing reactions in the presence of the coupling agent will produce a chemical bonding between the elastomer layer and the molding composition molded against it.

In carrying out the invention, the substrate part or layer may be of any metal to which the elastomer layer may be adhered with a strong bond and which provides the desired electrical, physical and chemical properties. For example, aluminum is easily formed to provide a metal liner for a transformer tank and has good vapor barrier properties. Aluminum and copper are good conductors and may be used for conductor terminal inserts. Stainless and corrosion resistant metals may be used as liners or as facings and coverings in plumbing and pump parts. In some applications, it may be desirable to use substrates of non-metallic materials, as to provide a composite of two molded plastic sections having different properties, or to provide an intervening elastomer layer of special properties, such as a conductive layer in certain electrical housings.

The elastomer coating which forms the bonding layer in the composite is desirably a thermosetting composition which is soluble in an organic solvent for convenient application to the substrate surface. The elastomer composition should be formulated to withstand the curing conditions of the resin composition molded in place against it, and to cure to a completely cured state under those conditions.

The elastomer composition may include;

a. The elastomer itself, which is preferably synthetic or natural rubber. Suitable rubbers include especially chloroprene rubber available as Neoprene. Other elastomers may also be used. Urethane is suitable if its temperature characteristics and the processing conditions are selected so that the urethane will withstand the molding and curing temperatures of the particular molding composition which will be molded against it.

b. Curing agents and catalyst for the elastomer composition, selected in accordance with conventional practice. These should be selected to give curing characteristics which will leave the elastomer coating in an incompletely cured state for a sufficient period in the processing sequence so that the composition will be in incompletely cured state when the resin layer is molded against it.

c. Fillers, in accordance with conventional practices of a character ad in quantities which will not interfere with adhesion of the elastomer to the adjoining layers and which will provide a relatively high degree of elasticity and strength for the elastomer layer. The fillers may be selected to provide special characteristics, for example, carbon black may be included to make the elastomer layer electrically conductive.

d. A bonding agent for bonding the elastomer to the substrate. A number of silane coupling agents are known for bonding rubber to metal and to other substrates. The selection of the bonding agent may be in accordance with conventional practices. Suitable bonding agents for bonding to metal include aminofunctional silanes, such as that sold by Dow Corning Corporation as No. Z-6020 and that sold by Union Carbide Corporation as No. A-1100.

In accordance wit the present invention, the elastomer composition also includes:

e. A coupling agent for bonding the elastomer layer to the molding composition. Suitable coupling agents for this purpose include, for example, a methacrylate-functional silane, such as methacryloxypropyltrimethoxysilane sold by Union Carbide Corporation under identification number A-174, and such as that sold by Dow Corning Corporation under identification number Z.6031. Suitable coupling agents also include the vinyl-functional silanes.

The elastomer composition desirably does not include components which, in the quantities present, would have an inhibiting action tht would interfere with the desired chemical reaction between the incompletely cured elastomer coating and the subsequently applied plastic molding composition, and this excludes certain components commonly employed in rubber adhesives. In particular, the elastomer composition preferably does not include antioxidants and hardener components. It also in general excludes components which have anti-adhesive characteristics, such as surface finishers and lubricants.

The several components of the elastomer composition are combined with a suitable solvent, for example to give from 15 percent to 35 percent solids, to enable the elastomer to be applied as a coating on the substrate in a uniform continuous thin film. It may be applied in any convenient way, such as spraying dipping, etc., in one or more applications.

The elastomer composition should also be one from which the solvent can be driven off by heating at a temperature and for a time which will not produce such curing or vulcanizing of the rubber as to prevent its reaction with the subsequently applied molded plastic, and which leaves a dry and stabilized coating of elastomer in an incompletely cured state for reaction with such molded plastic. The dried coating produced may have a thickness in the range of from 1 to 50 mils.

The plastic molding composition, which is molded in place under heat and pressure against the elastomer coating on the substrate, is desirably a thermosetting composition containing an ethylenically unsaturated thermosetting resin. It must on the one hand be a composition which is readily moldable under heat and pressure in metal dies and which does not adhere to the metal dies and is readily removable therefrom, and on the other hand a composition which will integrally bond by chemical reaction with the incompletely cured elastomer layer to form a strong integral chemical bond through that layer to the substrate. It must be moldable under temperature and pressure conditions which do not destroy or degrade the elastomer layer or its bond with the substrate surface, but which produce curing of the elastomer layer and bonding of that layer to the molded plastic.

The plastic molding composition may include:

a. An ethylenically unsaturated thermosetting resin. The polyester resins are especially suitable and are preferred. Suitable rsins also include modified epoxy resins, allyl resins such as polymers of diallyl phthalate and diallyl isophthalate, mixtures of polyester and allyl resins, vinyl ester resins, and others.

b. A polymerizable monomer which cross links with the resin, such as an ethylenically unsaturated monomer. Styrene is commonly used and is inexpensive.

c. A catalyst system, containing a free radical catalyst, such as a peroxide or an azo compound.

d. Fillers, including reinforcing fibers, such as glass fibers, asbestos, synthetic fibers such as nylon, cellulosic fibers, natural fibers such as sisal, and others. Fillers may also include conventional powders, which may be inert or which may provide special characteristics. For example, where the molded part is subjected to arcing or surface-tracking conditions. the composition may contain hydrated alumina to provide arc quenching and non-tracking characteristics.

e. Mold release agents in accordance with conventional practice. However, these should be of a character and used in such quantities as to avoid interference with the desired bonding reaction between the elastomer coating and the molding composition.

In general, the molding composition is formulated in accordance with known practices, care being taken to avoid the presence of any quantities of components which would interfere with the desired bonding with the elastomer coating.

The molding step is carried out in accordance with conventional practices, in metal dies formed to receive and support the coating substrate and to present its coated surface to the die cavity so that the molding composition is molded directly against the surface of the elastomer coating.

For purposes of determining bond strength, peel tests were carried out by coating aluminum foil with the elastomer coatings and molding the plastic molding compositions against the coating surfaces; scoring the foil layer of the resulting composite to form standard-width strips, and then peeling the strips from the composite and measuring the force required to effect such peeling. In comparison tests, the present invention gave peeling or bonding strengths up to 100 fold greater than those obtained with a conventional Neoprene adhesive.

Thermal shock tests were made by fabricating transformer housings in accordance with the present invention, cutting sections from such housings and subjecting them to repeated hot-cold cycling tests, as by heating the pieces to approximately 300° F, and then dropping them into dry ice at −100° F. The composite section withstood such tests without separation.

Terminal leakage tests were carried out by molding conductive terminal bars into bushings in the wall of a transformer housing, using the method of the present invntion, and subjecting the bushings to pressure tests which tended to force air longitudinally along the surface of the bars through the molded section. In such tests, terminals sealed in accordance with the present invention did not leak. Comparative bushings were made using the sealing system of Pat. No. 3,338,212, but using molded fiber-reinforced polyester resin molding composition instead of the epoxy resin used in that patent. That is, the terminal conductor and wall edges were coated with rubber and the rubber vulcanized before molding the polyester bushing against the rubber. In comparative tests on these bushings, it was found that leakage occurred along the terminal conductor and that the vulcanized rubber layer of the patent did not produced a satisfactory seal between the metal and the molded polyester resin.

BRIEF DESCRIPTION OF THE DRAWINGS

The accompanying drawings illustrate the invention. In such drawings:

FIG. 4 is an enlarged section of the high voltage terminal bushing in the tank cover;

FIG. 5 is an enlarged section of the high voltage ground bushing in the tank cover;

FIG. 6 is an enlarged section of a low voltage terminal bushing in the tank cover;

FIG. 7 is a somewhat diagrammatic sectional view of molding dies used to form the transformer tank;

DETAILED DESCRIPTION OF THE PREFERRED EMBODIMENT

Figure 1:
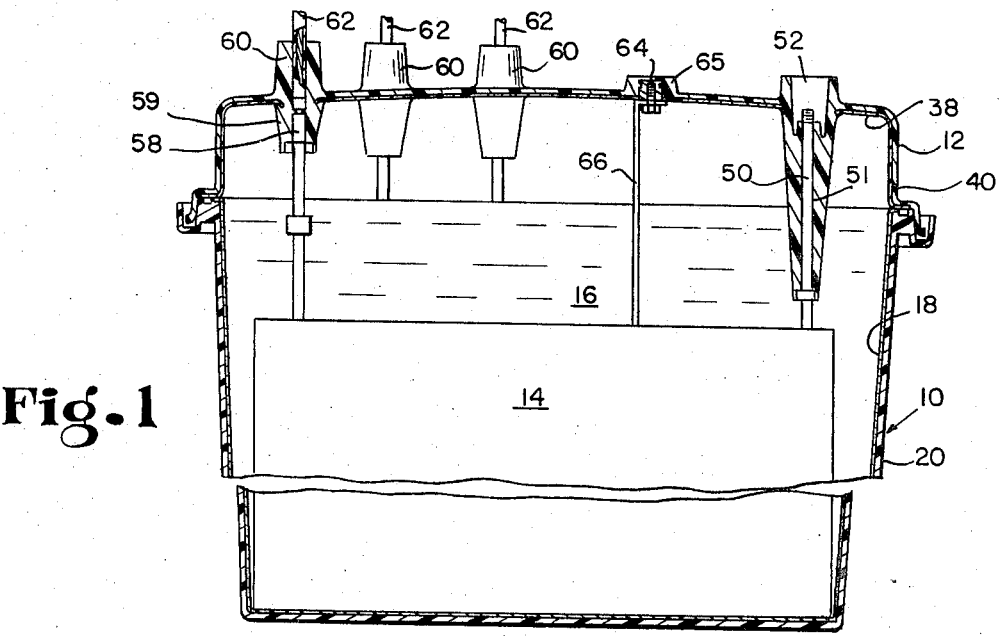
FIG. 1 is a vertical section through a transformer housing formed by walls made in accordance with the present invention, on the line 1-1 of FIG. 2.
Figure 2:
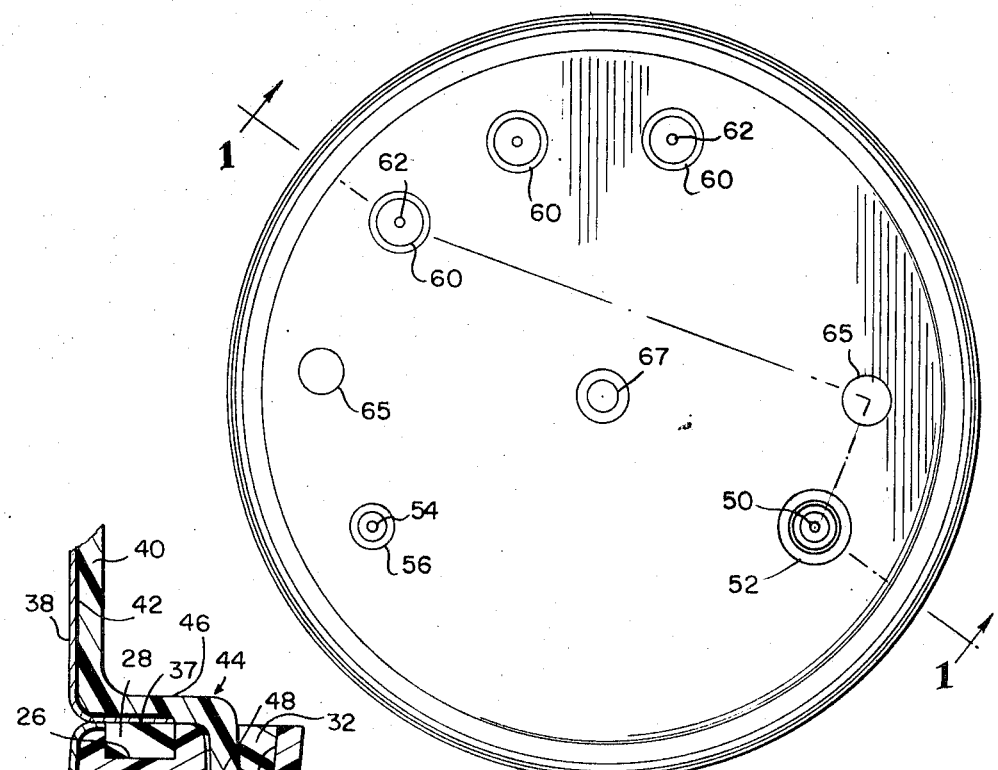
FIG. 2 is a top plan view of the housing of FIG. 1.

The transformer housing shown in FIG. 1 comprises a tank 10 and a cover 12 sealed to it with a double seal described below. The cover contains molded-in mounting inserts and terminal bushings by which a transformer 14 within the tank is suspended and connected to external conductors. The tank contains dielectric oil surrounding the transformer 14. In accordance with common practice, the transformer contains cellulose insulation which is known to degrade in the presence of very small amounts of water, so that rigorous conditions must be established to exclude water from the inside of the tank. The tank is intended for direct burial installation where it will be subjected to corrosion at various soil pH levels, where it will be continuously subjected to external moisture for long periods, where it must provide adequate heat transfer to the soil without significant increase in physical size, and where it must be capable of maintaining its integrity and the integrity of the seal between its tank and cover during thermal cycling. In addition, it must be economically competitive with other housings, such as those formed of mild steel and coated with bituminous or other protective coatings and connected to a buried electrode in an electro-chemical system which provides cathodic protection. Further, the tank must have a service life of the order of 20 to 30 years before it needs to be removed from the ground.

From many points of view, and especially from the point of view of corrosion resistance, long life, and low cost, it would be desirable to form such a tank from molded plastic materials. However, investigation of various molding compositions indicated that such materials transmitted moisture at rates very much higher than an acceptable level. It was concluded that it would be necessary to provide a metal liner to form an impervious vapor barrier. Upon consideration of the requirements for such a liner, it was concluded that this would require an integral bond between the barrier and the molded plastic wall. The transformer tank shown in FIG. 1 provides such an integral bond and is made in accordance with the present invention.

In addition, conductive terminals had to be provided through the transformer housing wall to connect the transformer to external conductors. It is necessary that such conductors be sealed to the transformer housing in a manner which prevents leakage longitudinally along the surface of the conductor. The present invention allows such terminal condutors to be molded into the wall of the housing, preferably the wall of the cover, as shown, and to provide an impervious seal against leakage along the surface of the terminal conductor.

Figure 3:
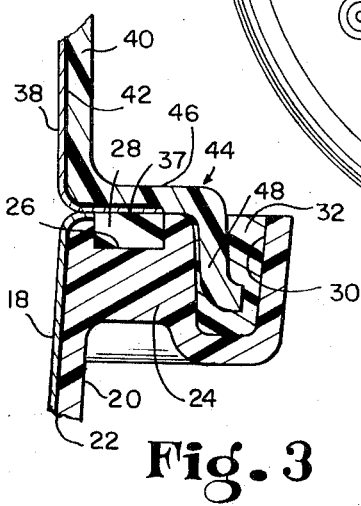
FIG. 3 is an enlarged section of the joint between the tank and cover of the transformer housing of FIG. 1.

The tank 10 comprises a formed aluminum liner 18 adapted to cover substantially the entire inner surface of the tank and this has a plastic wall 20 molded in place against it and integrally bonded to the liner. As shown in FIG. 3, there is also a thin interface layer 22 between the liner 18 and the plastic wall 20, which serves to bond the liner and the plastic wall together. The tank is of simple bucket shape and of circular cross section.

The upper edge of the tank 10 carries a rim 24 formed on its upper face with a circular groove 26 for the reception of a sealing gasket 28. Outwardly therefrom, the rim 24 is formed to provide a trough 30 for the reception of a depending flange of the cover. When the tank is assembled, the trough 30 is filled with a casting resin or sealing compound, such as an epoxy sealing compound 32.

The cover 12 is similarly formed of a shaped aluminum liner 38 and an outer plastic wall 40 molded in place against the liner 38 and integrally bonded thereto. As shown in FIG. 3 there is also an interface or bonding layer 42 through which the liner and plastic wall are bonded together. At the outer periphery, the cover carries a rim 44 having a horizontal stretch 46 which is adapted to rest on the sealing gasket 28, and having a depending flange 48 received in the trough 30 and sealed to the rim 24 of the tank 10 by the sealing compound 32 in that trough 30.

For connecting the transformer 14 to external conductors, the cover contains a high voltage conductor 50 molded in a bushing 52; a high voltage ground terminal 54 molded in a bushing 56; and three low voltage terminal conductors 58 molded in bushings 60 and connected to external insulated cables 62. The cover also has a pair of bosses 65 containing inserts 64 from which the transformer 14 is hung by straps 66, and has a central fill opening 67. The iner 38 of the cover is provided with openings at the bushings 52, 56 and 60, and such bushings are molded in place about the conductors as the plastic wall 40 of the cover is molded against the liner 38.

In each instance, the conductor and the molded plastic section is integrally bonded together by an interface bonding layer 51, 55, and 59, shown in the enlarged sections of FIGS. 4-6.

The method of forming the tank is illustrated in FIG. 7. The liner 18 is formed to its desired shape, as by drawing or spinning, with a short rim 19 at its open end. The entire external surface of the liner is then sprayed with a thin coating of elastomer solution. The coated liner is then heated or baked as in an oven to drive off the solvent and to leave on the surface of the liner 18 a stable continuous coating 22 of incompletely cured elastomer. The thus coated liner 18 is placed on the male die 70 of a set of molding dies in a press. The die 70 is heated by internal heaters 72 and additional heat may be supplied from base heaters 74. The female die 76 of the molding dies is mounted above the die 70 in the press, and is heated, as by band heaters 78. A charge of molding composition 80 is placed in the mold cavity, as on the end surface of the liner 18, and the upper die 76 is then lowered to close the cavity and force the plastic molding composition 80 to flow into all parts of the mold cavity. The dies are held closed, with the molding composition under heat and pressure for a sufficient time to cure the thermosetting molding composition 80 and to complete the cure of the elastomer layer. The dies are then opened, and the completed tank 10 is removed from the die 70.

The cover 12 is molded in a similar manner. Th liner 38 is formed and punched in suitable metalworking dies to provide the desired configuration and the several openings at the bushings. The liner is then coated over its entire external surface with a coating of elastomer material, as by spraying. The coating is dried under heat to drive off the solvent and to leave a stable coating of elastomer composition in incompletely cured state. The terminal conductors 50, 54 and 58 are coated over all or selected parts of their side surfaces with coatings of elastomer composition, as by spraying, and the coatings are heated, as in an oven, to drive off the solvent and form a stable coating layer of elastomer in incompletely cured state. The thus coated liner is placed between a pair of molding dies, in position to be supported by one of such dies, and with its coated surface exposed within the die cavity so that the molding composition will be molded against that coated face. The thus coated terminal conductors are mounted in the dies in proper position relative to the openings in the liner 38, together with the support inserts 64 and a plug for the fill opening 67.

Molding composition is then placed in the heated dies, and the dies operated to mold the composition against the coated surfaces of the liner 38 and the terminal conductors 50, 54 and 58. The molded composition is held under heat and pressure for a sufficient time to cure the molding composition in contact with the molded liner 38 and the coated terminal conductors, and this not only cures the molding composition but also completes the cure of the elastomer composition and produces an integral chemical bond between the liner and the conductors on the one hand and the molded composition on the other. This forms a complete composite cover in a single molding operation, including the closure wall with it liner 38 and its exterior plastic layer, the rim 44, the several bushings, and the inserts.

Figure 8:
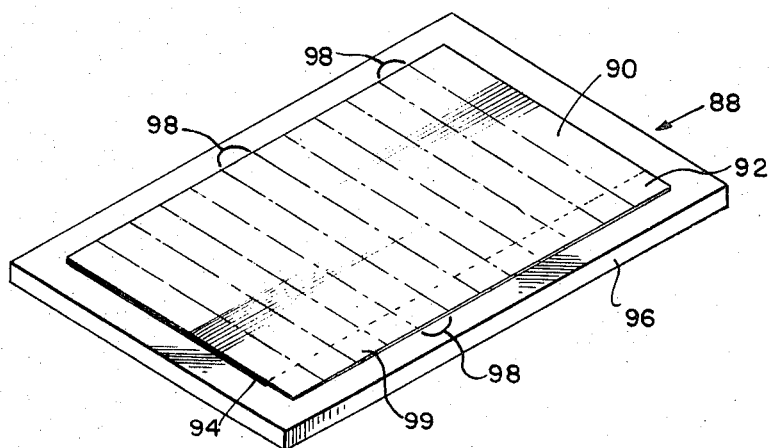
FIG. 8 is an isometric view of a composite in accordance with the invention which represents a peel test specimen but which also serves to represent an embodiment of the invention in a relatively simple form such as might be used for a circuit board.

For purposes of testing the bond strength between the metal and plastic layers of composite walls as exemplified by the transformer housing described above, peel test specimen boards 88 were prepared as shown in FIG. 8. A sheet of aluminum foil 90 was coated on one face, over its entire area except for a border portion 92, with a coating of elastomer composition 94. The coating was dried to drive off the solvent, and to form a stable coating of elastomer composition in incompletely cured state. The coated foil 90 was then placed in a mold with its coated face exposed to the mold cavity, and a supporting flat plate 96 was molded against that face. The molded plate was held under heat and pressure for sufficient time to cure the molding composition, and to simultaneously complete the cure of the elastomer coating. The molded composite board 88 was removed from the dies and cooled.

The foil layer 90 was then scored on parallel lines to define strips 98 of equal one-inch width. The border area 92, where the foil 90 had not been coated with the elastomer composition did not adhere to the molded plae 96, and the strips 98 ran from that border 92 transversely across the area which had been coated with the elastomr layer 94.

Figure 9:
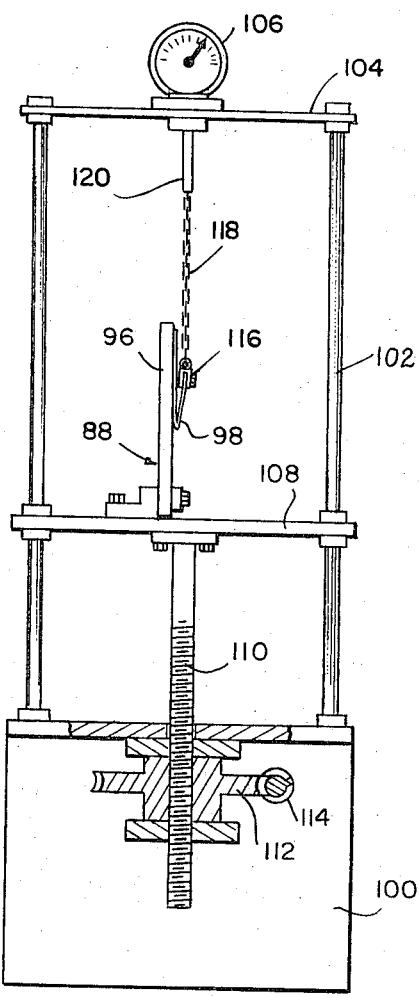
FIG. 9 is a somewhat diagrammatic view of peel strength test apparatus for testing the bonding strength between metallic surfaces and plastic sections molded in place against them.

To test the bond strength between the metal layer 90 and the molded layer 96 of the composite, the board 88 was mounted in test apparatus as shown in FIG. 9. This comprised a base 100 having posts 102 at its corners supporting a cross head 104 on which a tension gauge 106 was mounted. The posts 102 carried a vertically slidable platen 108 mounted on a screw 110 which could be raised and lowered by a threaded nut 112 driven by worm 114 from a controlled power source. The board 88 was clamped to the platen 108 in a vertical position, with the border portions 99 of its foil strips 98 downward. A clamp 116 was then clamped to the free end or border portion 99 of a strip, and connected by a chain 118 to the tension member 120 of the gauge 106. The platen 108 was then lowered at a controlled rate and observation was made of the pull registered on the gauge 106. That observed tension represented the peel strength or bonding strength of the bond between the metal foil layer 90 and the molded layer 96.

Figure 10:
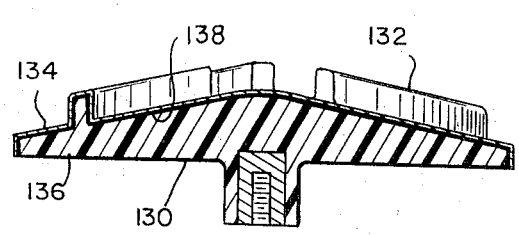
FIG. 10 is a section of a pump rotor in which a non-corrosive or wear-resistant metal liner is bonded to a supporting plastic body molded against the inner face of the liner, representing the application of the invention to composites in which the interface is of complex configuration and in which the substrate or liner is on the exterior instead of the interior of the structure.

The composite pump impeller shown in FIG. 10 represents the many complex shapes which can be made in accordance with the present invention. That impeller comprises a body portion 130, the front face of which carries a series of protruding and curved vanes 132 which extend from an open eye area outward to the periphery of the body portion 130 and may be curved either forwardly or rearwardly as is customary in pump impellers. The impeller is fabricated as a composite of a facing or liner 134 of metal or the like and a body or backing of plastic 136 which is molded in place against the liner 134 and integrally bonded thereto. This is formed in the same general way as the transformer housing of FIG. 1 and the coated plate of FIG. 8. The facing or liner 134 is formed to the desired shape from the desired metal, which may be stainless steel or other non-corrosive metal. The back face of the formed liner 134 is then coated with a thin coating of elastomer solution and this is dried to leave a stable coating layer 138 of elastomer in incompletely cured state over the entire rear face of such liner. The liner is then mounted in a set of molding dies, with its coated face exposed to the mold cavity, and the elastic body 136 is molded in place against that coated surface by conventional molding practices.

The following examples exemplify the fabrication of composites in accordance with the invention. In all cases "parts" are by weight.

EXAMPLE I

A composite transformer housing as shown in FIGS. 1-4 was fabricated by the procedure generally described above. The liner 18 of aluminum was prepared by spinning. Its external surface was thoroughly cleaned, and was then sprayed with a bonding coat of the following composition:

| | |
|---|---|
| Elastomer, Neoprene | 100 parts |
| Curing Agent, zinc oxide | 5 parts |
| Stabilizer, magnesia | 5 parts |
| Metal bonding agent (Dow Corning Z-6020) | 5 parts |
| Coupling agent, for bonding to the molded plastic (Union Carbide A-174) | 5 parts |
| Solvents | 300 parts |

The coated linings were then baked in a oven heated to 300°F. for sufficient time to drive off the solvents and stabilize the elastomer coating as a stable coating layer over the entire external surface of the liner 18 and to leave the elastomer in an incompletely cured state. The liner had a thickness of 0.026 inches, and the coating had a thickness of approximately 2 mils.

The coated metal liner was then placed in molding dies of the general type shown in FIG. 7 and described above, and an outer wall 20 was molded against the incompletely cured elastomer coating under heat and pressure in the manner previously described. The molding heat and pressure were maintained for a sufficient time to cause the plastic molding composition to cure (from the applied and retained heat), and to cause the elastomer layer to be completely cured. With the coupling agent present, this caused the elastomer layer and the molded layer to react together to form an integral chemical bond between those two layers. The molded composite was then removed from the dies. The molded layer thus formed was approximately 0.150 inches thick over the side wall of the tank 10 and from 0.375 inches to 0.475 inches thick ove the bottom wall.

The molding composition used was a glass reinforced polyester resin composition of a standard formula widely used to fabricate supporting and electrical insulating parts in electrical apparatus, which was selected on the basis of its qualities of strength, moldability, high voltage insulation properties, reasonable cost, and especially high corrosion resistance. The composition had the folllowing formula:

| | |
|---|---|
| Resin, polyester, styrene cross-linked | 30 parts |
| Filler, hydrated alumina | 40 parts |
| Reinforcement, fiber glass | 30 parts |
| Catalyst, peroxide | 1 part |
| Parting Agent, zinc stearate | 1 part |

Such formula was typical of polyester molding compositions which may be used in accordance with the present invention.

Such molding compositions may vary widely in their formulation, in accordance with conventional practices. By way of example, such compositions may contain from 10 to 60% polyester resin system, including the resin polymer and the cross-linking monomer, from 25 to 80% or more by weight of filler and reinforcing material, and up to 5% of processing agents, such as catalysts, and other conventional or desirable components such as parting agents. The filler material may be any of vaiorus materials known for this purpose, such as clay flour and the like, calcium carbonate, and aluminum oxide and hydrate. Hydrated alumina is especially advantageous for its arc quenching and track-resistant properties. The reinforcing materials may be glass fiber, asbestos, organic fibers, etc.

Various tests were carried out to determine the bond strength between the aluminum liner and the molded plastic wall, and it was found that a strong integral bond existed between the interface bonding layer of elastomer and both the metal liner and the plastic wall. In general, the bonding strength between the liner and the plastic wall appeared to be limited by the internal strength of the elastomer layer, for on forceable separation of the two, the elastomer layer itself was torn apart and its opposite sides remained bonded to the liner and to the plastic layer.

Sections cut from a transformer tank molded in accordance with this example were subjected to thermal shock tests in which such sections were first heated to 300° F. and were then dropped into dry ice at −100° F. Test pieces were repeatedly cycled through this test, and the bond between the metal lining and the molded plastic wall remained unbroken.

From these and other tests, it is concluded that the presence of the interface layer of elastomer between the metal liner and the molded plastic wall is of substantial importance to the integrity of the composite structure. Its use gave substantially improved results over composites which lacked the elastomer bonding layer, for example in which bonding was sought to be obtained by primers or conventional adhesives.

EXAMPLE II

A composite transformer cover as shown in FIGS. 1–4. was fabricated by the procedure generally described above. A liner 38 was formed and punched to the dished configuration shown, with a rim 37 and with openings for the terminal conductors and their bushings. Its external surfaces were thoroughly cleaned and were then sprayed with a bonding coat of the same composition used in Example I. The resulting coating was dried to leave a stable coating layer over the surface of the liner, in an incompletely cured state.

A high voltage terminal conductor 50 and grounding conductor 54 were prepared and similarly coated over their side surfaces with the same elastomer composition. Low voltage terminal conductors were prepared by swaging the terminal 58 over the bared metal strands of an insulated cable 62, and elastomer coating material was applied to the external surfaces of the terminal conductor 58 and the side surfaces of the insulating sheath on the wire 62, and dried.

The coated liner 38 and the coated terminals 50, 54 and 58 were fixed in a pair of molding dies, and molding composition was molded against their coated faces under heat and pressure in accordance with known molding practice. The molding heat and pressure were maintained for sufficient time to cause the molding composition to cure and to complete the cure of the elastomer layer, and to cause the elastomer layer and the molded layer to react together to form an integral bond between those two layers.

The molding composition used was a glass-reinforced polyester resin composition of a standard but slightly different formula than that used in Example I, which was selected on the basis of its qualities of especially good molding characteristics and good high voltage insulation characteristics. The composition had the following formula:

| | |
|---|---|
| Resin, low-shrink polyester, styrene cross-linked, | 30 parts |
| Filler, hydrated alumina | 40 parts |
| Reinforcement, fiber glass | 30 parts |
| Catalyst, peroxide | 1 part |
| Parting Agent, zinc stearate | 1 part |

In the resulting molded cover, an integral bond was obtained between the shaped metal liner 38 and the plastic wall 40 molded against it with an intervening bonding layer of elastomer. A similar bonding was obtained between the terminal conductors and the bushings molded about them, and the seal between them was sufficient to prevent leakage longitudinally along the surface of the terminal conductor through the bushing.

EXAMPLE III

Test specimen boards 88 were prepared as shown in FIG. 8 and described above, by molding a plate 96 against an aluminum foil liner 90 coated over most of its surface with an elastomer coating 94. For one test, the elastomer coating used was a standard Neoprene adhesive of the following composition:

| | |
|---|---|
| Neoprene | 100 parts |
| Magnesia | 4 parts |
| Anti-oxidant | 2 parts |
| Zinc oxide | 5 parts |
| Tertiary Butyl Phenolic Resin | 40 parts |
| Solvent, sufficient to give approximately 25% solids. | |

The adhesive was applied to the surface of the foil 90 by spraying, and the coated foil was then baked at 300° F to drive off the solvent and to stabilize the adhesive coating. The coated liner 90 was then placed in molding dies, with its coated surface exposed, and a plate 96 molded against it, using a styrene cross-linked polyester resin composition as set forth in Example I.

Corresponding test boards were prepared using the elastomer coating composition of Example I.

Peel tests were carried out on the apparatus of FIG. 9 and observation was made of the force required to peel the strips 98 from the boards. In tests of boards having the standard Neoprene adhesive, the peel force was less then 0.2 lbs. With boards having an elastomer bonding layer as in Example I, peel force values of from 8 to 14 lbs. were obtained, and which showed increases over the use of the standard adhesive of up to 100 fold.

Other molding compositions than the polyester compositions of Example I-III may be used. Such other resins, include modified epoxy resins exemplified by the following typical formula:

| | |
|---|---|
| Epocryl resin, styrene cross linked | 100 parts |
| Filler, hydrated alumina | 40 parts |
| Glass fiber reinforcement | 30 parts |
| Catalyst | 1 part |
| Parting Agent | 1 part |

The elastomer bonding layer used with modified epoxy plastic compositions may contain an amino-functional bonding agent for bonding to the metal substrate, and a coupling agent for bonding to the modified epoxy molding compositon. Silane coupling agents for reaction with modified epoxy resins may be obtained from Dow Corning Corporation or Union Carbide Corporation.

Other molding compositions which may be used include allyl resin compositions and vinyl ester resin compositions. In each case, the substrate will be coated with an elastomer bonding layer integrally and chemically bonded to the substrate as by including an amino-functional coupling agent in the formula of the elastomer composition. The elastomer composition will also contain a coupling agent which reacts with the molding composition which is molded against it under heat an pressure, so as to form an integral chemical bond between the elastomer layer and the plastic.

I claim:

1. The method of forming a composite of a substrate and an overlay of fiber-reinforced thermoset plastic composition conforming and bonded thereto, which comprises
preparing a substrate having an extended surface,
coating said surface with an uncured elastomer composition in the presence of a bonding agent for bonding the elastomer to the substrate surface, and treating the coating to stabilize the same as a stable coating layer on said surface without completely curing the elastomer composition,
molding a fiber-reinforced thermosetting plastic molding composition in place against the incompletely cured elastomer layer under pressure and heat, in the presence of a coupling agent for bonding the plastic to the elastomer,
and maintaining the pressure and heat for a time sufficient to cure both the plastic composition and the elastomer layer, and to effect chemical bonding of the plastic and elastomer layers.

2. The method of claim 1 in which the bonding agent is contained in the uncured elastomer composition.

3. The method of claim 1 in which the coupling agent is contained in the uncured elastomer composition.

4. The method of claim 3 in which the plastic molding composition is an ethylenically unsaturated resin composition.

5. The method of claim 4 in which the plastic molding composition is a polyester resin composition.

6. The method of claim 4 in which the plastic molding composition is a modified epoxy resin composition.

7. The method of claim 4 in which the plastic molding composition is an allyl resin composition.

8. The method of claim 4 in which the plastic molding composition is a vinyl ester resin composition.

9. The method of claim 3 in which the substrate is a metal liner having an extended surface to which the elastomer coating is applied and the plastic composition is molded to form a wall layer against said liner.

10. The method of claim 3 in which said substrate is a terminal conductor of elongated bar shape, said elastomer coating is continuous about the entire circumference of said bar shape over a substantial portion of its length, and said plastic composition is molded as a bushing about said bar shape with the ends of the bar exposed at opposite ends of the bushing to thereby form an electrical conductor through the bushing, so as to integrally bond the conductor to the surrounding bushing over a substantial portion of its length and hermetically seal it against leakage longitudinally of the bar.

11. The method of forming a composite of a metal substrate and a polyester resin body conforming and bonded thereto, which comprises
preparing a metal substrate having an extended surface, coating said surface with an uncured elastomer in the presence of a bonding agent for bonding the elastomer to said surface, said elastomer containing a coupling agent for bonding the same to the subsequently applied molding composition, and treating the coasting to stabilize the same as a stable layer of incompletely cured elastomer on said surface;
mounting said coated substrate in molding dies with the coated surface thereof exposed to the molding cavity,
molding a polyester resin molding composition against said incompletely cured elastomer layer in said dies under pressure and heat,
and maintaining the heat for a time sufficient to cause curing of both the polyester resin composition and the elastomer and to cause said coupling agent to react therewith to effect chemical bonding of the resin and elastomer layers.

12. The method as in claim 11 in which the elastomer is a chloroprene rubber.

13. The method as in claim 11 in which the elastomer contains both said bonding agent and said coupling agent.

14. The method as in claim 13 in which the bonding agent is an amino-functional silane and said coupling agent is a methacrylate-functional silane.

15. The method of forming a composite wall for an electrical transformer or the like, containing both a metal vapor barrier and molded-in terminal conductors, comprising
forming a metal liner having the configuration of the wall and adapted to cover substantially its entire area, and forming openings in said liner to clear the desired terminal conductors,
coating substantially the entire outer surface of the liner and the entire circumferential surface of terminal conductors over at least a portion of their length with an incompletely cured elastomer composition containing both a bonding agent for bonding the elastomer to the metal of the liner and a coupling agent for coupling the elastomer to the subsequently applied molding composition, and stabilizing such coating, placing both the coated liner and terminal conductors in molding dies with their coated surfaces exposed in the mold cavity, and with the conductors positioned in the liner openings, and molding a fiber-reinforced thermosetting plastic composition in the mold cavity under heat and pressure against the uncured elastomer on said liner and conductors to form molded plastic layer against the liner over its entire outer surface and to form bushings integral therewith surrounding the terminal conductors and extending through said liner openings, and maintaining the heat and pressure for a time sufficient to cure the molded plastic and the uncured elastomer and bond the same together by the action of said coupling agent, thereby forming in a single molding step a composite wall complete with a metal vapor barrier liner and terminal conductors through the wall, with the wall exterior formed of plastic composition and with the liner and conductors integrally bonded and sealed to the plastic composition.

* * * * *

UNITED STATES PATENT OFFICE
CERTIFICATE OF CORRECTION

Patent No. 3,844,030　　　　　Dated October 29, 1974

Inventor(s) Robert E. Wilkinson

It is certified that error appears in the above-identified patent and that said Letters Patent are hereby corrected as shown below:

Column 2, line 3, change "wall" to --walls--.

Column 3, line 62, change "practices" to --practices,--.

Column 3, line 63, change "ad" to --and--.

Column 4, line 12, change "wit" to --with--.

Column 4, line 25, change "tht" to --that--.

Column 4, line 40, after "spraying" insert a comma.

Column 5, line 4, change "rsins" to --resins--.

Column 5, line 20, change "conditions." to --conditions,--.

Column 5, line 60, change "invntion" to --invention--.

Column 7, line 66, change "iner" to --liner--.

Column 8, line 32, change "Th" to --The--.

Column 8, line 67, change "it" to --its--.

Column 9, line 24, change "plae" to --plate--.

UNITED STATES PATENT OFFICE
CERTIFICATE OF CORRECTION

Page 2

Patent No. 3,844,030　　　　　　　　　Dated October 29, 1974

Inventor(s) Robert E. Wilkinson

It is certified that error appears in the above-identified patent and that said Letters Patent are hereby corrected as shown below:

Column 9, line 26, change "elastomr" to --elastomer--.

Column 10, line 50, change "ove" to --over--.

Column 13, line 35, change "an" to --and--.

Column 15, line 12, change "molded" to --a molded--.

Signed and sealed this 11th day of March 1975.

(SEAL)
Attest:

RUTH C. MASON
Attesting Officer

C. MARSHALL DANN
Commissioner of Patents
and Trademarks